Aug. 13, 1963     N. B. WALES, JR     3,100,400
DOUBLY INTEGRATING ACCELEROMETER
Filed Aug. 11, 1961     2 Sheets-Sheet 1

INVENTOR
Nathaniel B. Wales jr

INVENTOR

Nathaniel B. Wales Jr

United States Patent Office

3,100,400
Patented Aug. 13, 1963

3,100,400
DOUBLY INTEGRATING ACCELEROMETER
Nathaniel B. Wales, Jr., Sharon, Conn., assignor to The Metrodynamics Corporation, a corporation of New Jersey
Filed Aug. 11, 1961, Ser. No. 130,849
7 Claims. (Cl. 73—490)

This invention relates to a distance responsive device for vehicles and missiles based on the double integration of linear accelerations by a novel differential gearing system.

It is well known in the art of inertial navigation of vehicles to apply a torque proportional to the linear acceleration of a vehicle along a selected axis to an integrating flywheel. In this way, the angular motion of the flywheel becomes an analog of the linear motion of the vehicle, and the angular displacement of the flywheel becomes proportional to the distance travelled by the vehicle along the selected axis.

However, the prior art has in general utilized electromechanical means involving displacement transducers, electrical power supplies, amplifiers, equalizing networks, and electromagnetic torque motors, in order to carry out this principle.

The present invention obviates these complexities by utilizing in its preferred form a wholly mechanical servo loop which frictionally couples torque from a mechanical power rotor to an integrating flywheel in response to error torque signals provided by an unbalanced acceleration-sensitive rotor.

An important feature of my invention is the use of a differential gear to divide the foregoing servo-controlled frictional input torque between the integrating flywheel and the acceleration-sensitive rotor, so that the inertia of the feedback loop may be made independent of the inertia of the integrating flywheel.

Another feature of my invention is the provision of a stored energy flywheel which a starting signal can release to convert the stored energy into kinetic rotational energy available to power the integrating servo system.

One object of my invention is to provide a self-contained distance meter suitable for arming missiles.

A second object is to provide an inertial distance meter of great simplicity and reliability.

A third object is to provide a doubly integrating accelerometer, using a pendulous acceleration sensor and an integrating flywheel, in which the angular inertia of the sensor is independent of the angular inertia of the flywheel.

A fourth object is to provide an integrating accelerometer in which the integrating power is supplied by a kinetic flywheel whose energy is stored in potential form until the receipt of a start signal.

Other objects are implicit in the specifications and claims.

Figure 1:
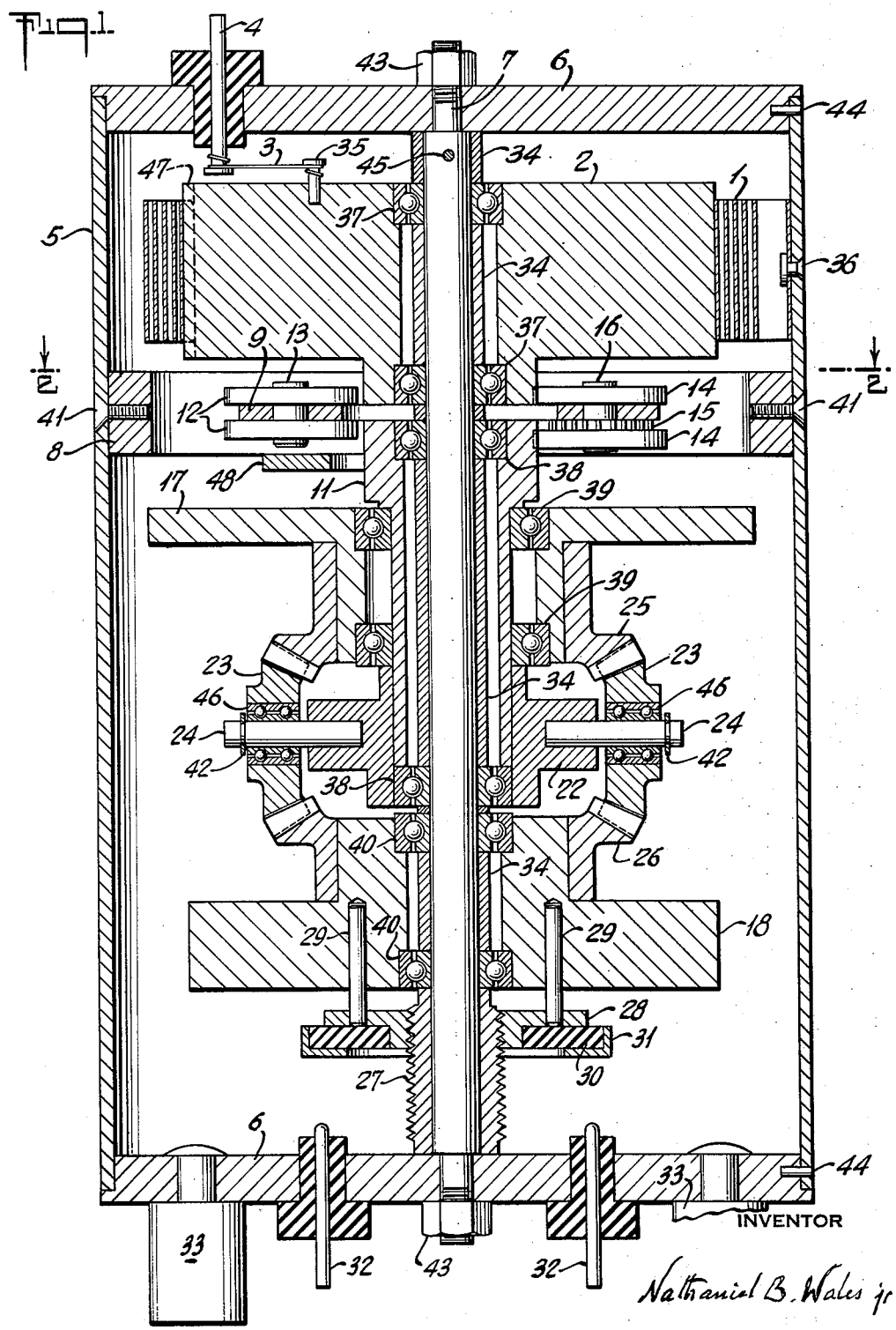
Figure 2:
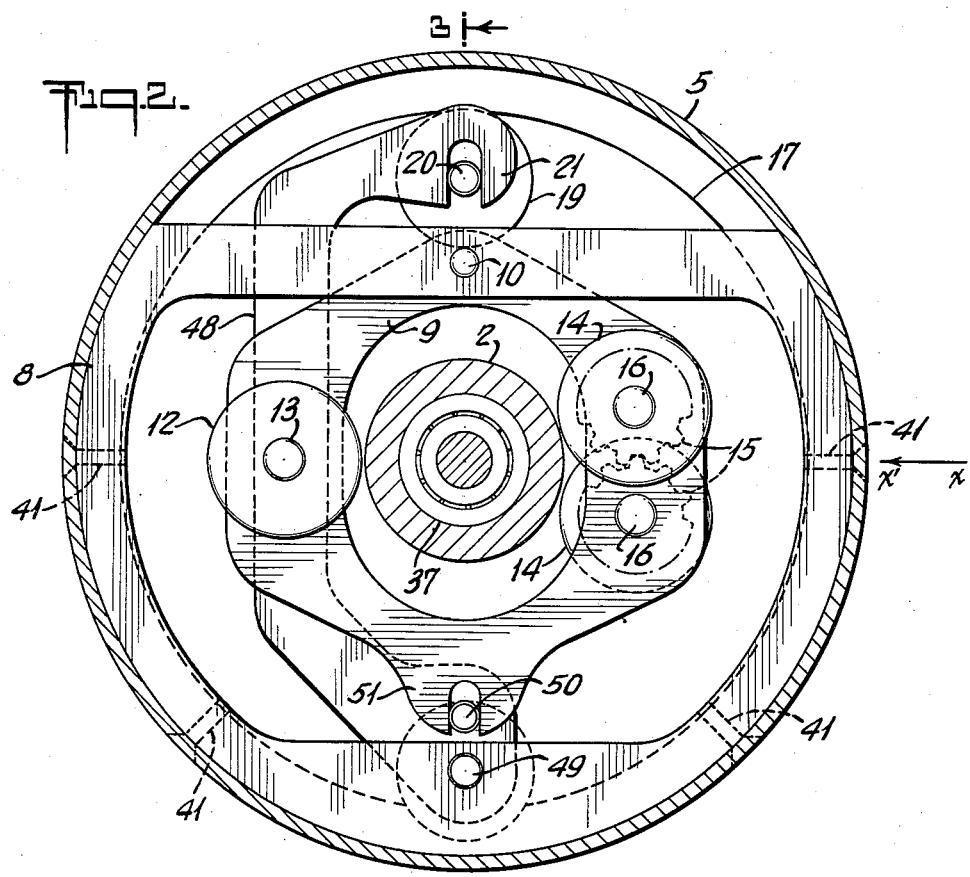
Figure 3:
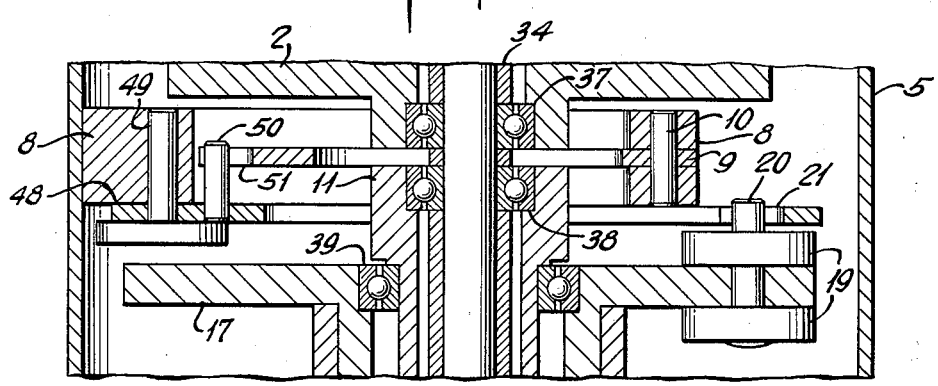

In the drawings, FIG. 1 is a central longitudinal section through the preferred embodiment of my invention; FIG. 2 is a transverse section through 2—2 of FIG. 1; and FIG. 3 is a fragmentary longitudinal section through 3—3 of FIG. 2.

Referring to the drawings, it may be seen that an energy storage flywheel 2 is freely journalled on a central stationary shaft 7 by means of the ball bearings 37.

Also journalled on shaft 7 is the torque input sleeve 11 by means of ball bearings 38, and the integrating flywheel 18 by means of ball bearings 40.

All the inner races of bearings 37, 38, and 40 are spaced apart and secured by the sleeves 34, and threaded arming sleeve 27. Nuts 43 on the threaded ends of shaft 7 allow the foregoing bearings and sleeves to be clamped between the end plates 6 so as to form with cylindrical case 5 a closed assembly which may be secured in the proper orientation to the vehicle by means of mounting studs 33 which are secured to the lower end plate 6. Locating pins 44 are provided to phase case 5 with end plates 6 properly, while roll pin 45 is supplied to aid assembly.

The pendulous acceleration sensing rotor 17 is concentrically journalled on input torque sleeve 11 by means of ball bearings 39. This arrangement allows the torque delivered by sleeve 11 to be coupled to both the accelerometer rotor 17 and to the integrating flywheel 18 by means of the differential gear system including collar 22 secured to sleeve 11, spindles 24 secured to collar 22, differential input bevel gears 23, output bevel gear 25 secured to accelerometer rotor 17, and output bevel gear 26 secured to integrating flywheel 18. Bevel gears 23 are journalled on spindles 24 by means of ball bearings 46, which are in turn retained by E rings 42.

Power flywheel 2 is surrounded by the clock type energy storage spring 1, one end of which engages slot 47 in rotor 2 by a hook configuration, and the other end of which is secured to the case 5 by shoulder stud 36, which engages a slot in spring 1.

In the stored energy position shown in FIG. 1, rotor 2 is restrained from rotation by the fusible wire 3 which anchors at one end on pin 35 secured to rotor 1, and at the other end on the insulated electrical starting terminal 4.

The starting signal consists of a current pulse between case 5 and terminal 4 adequate to melt the fusible wire 3, and allow the spring 1 rapidly to spin rotor 2 up to a high angular velocity, after which spring 1 disengages slot 47, and lies expanded against the inside of case 5, thereby allowing rotor 2 to spin freely.

In FIG. 3 it may be seen that the pendulous unbalance mass for sensing accelerations consists of the cylindrical weights 19 secured near the periphery of rotor 17 and provided with the servo lever coupling pin 20.

The feedback for the servo system is provided by a compound lever system consisting of input servo lever 48 and the output servo lever 9, which together yield a large force amplification factor for the acceleration error signals.

Input servo lever 48 is pivoted on pivot ring 8, which is secured to case 5 by screws 41. Lever 48 is provided at its outer end with a slot or fork 21 which embraces pin 20, and so is coupled to the angular motions of rotor 17. Near the pivot axis of lever 48 is secured a coupling pin 50, which is in turn embraced by the fork slot 21 of output servo lever 9. Lever 9 is pivoted in a slotted portion of pivot ring 8 by the pin 10. By this compound lever multiplication, a clockwise force on pin 20 will appear as a force on the order of twenty times larger at the mid point of output lever 9.

Lever 9 is provided on one side with a pair of friction clutch wheels 12 which are rigidly coupled together and journalled on lever 9 by the shaft 13. Clutch wheels 12 are each tangent to one of the cylindrical clutching surface extensions of either power flywheel 2 or torque sleeve 11. Consequently, any clockwise rotation of accelerometer rotor 17 (as seen in FIG. 2) by the action of compound levers 9 and 48 will bring a frictional coupling via wheels 12 to bear between power rotor 2 and sleeve 11, so as to deliver a torque to the latter of a magnitude determined by the torque on rotor 17, the total ratio of the compound lever arms, and the coefficients of friction of the clutch system.

On the opposite side of lever 9 from clutch wheels 12 a second pair of frictional clutch wheels 14 journalled on lever 9 by shafts 16 are provided. However, these two wheels 14 are geared together by pinions 15 so as to rotate in opposite directions. Consequently, a counterclockwise torque on accelerometer rotor 17 will cause a transfer of torque to sleeve 11 from rotor 2 by clutch wheels 14 which is opposite in sense to the torque transferred thereby by friction wheels 12 under a clockwise displacement of rotor 17.

An arming nut 28 is freely threaded on to the stationary threaded arming sleeve 27, and is rotationally and slideably coupled to the integrating flywheel 18 by means of the parallel pins 29 secured to nut 28, and which slideably engage corresponding holes in rotor 18.

Consequently, as rotor 18 rotates in the direction corresponding to arming distance, nut 28 advances axially away from rotor 18. Nut 28 is provided with an insulating collar 30 and an insulated arming ring 31 all secured together.

When nut 28 has advanced axially a predetermined distance away from rotor 18, it will therefore carry metal conductive ring 31 into electrically shorting relation to the insulated arming terminals 32 secured to base plate 6, thereby enabling any series electrical circuit including terminals 32.

The operation of this preferred form of my invention is as follows:

On receipt of the start signal by terminal 4, fuse wire 3 will melt and allow spring 1 to bring rotor 2 up to a high rotational speed.

When the vehicle in which this device is mounted undergoes a forward urging acceleration along the axis shown in FIG. 2 as $xx'$, the pendulous mass 19 will generate a proportional torque on rotor 17. This acceleration responsive torque will act on levers 9 and 48 to press friction clutch wheels 12 into the corresponding clutch shoulder of spinning flywheel 2 and the clutch shoulder of sleeve 11. As a consequence, sleeve 11 will be subjected to a torque which will be transmitted by the differential gears 23 in opposite directions to rotors 17 and 18.

The sense of rotation of rotor 2 is so chosen that the torque due to wheels 12, transmitted via sleeve 11 and gears 23 to rotor 17, is in the opposite direction to the acceleration torque on rotor 17 which caused the clutching action of wheels 12. Increasing torque delivery to sleeve 11 thus tends to come to equilibrium with the acceleration forces acting on pendulum 19.

For this reason, a servo loop is formed which will tend to maintain a torque in sleeve 11 which is continuously proportional in magnitude and direction to the linear accelerations experienced by the vehicle along axis $xx'$.

However, since the differential gears 23 divide the input torque from sleeve 11 equally and oppositely between rotors 17 and 18, it follows that the foregoing servo balancing action also angularly accelerates the integrating flywheel 18 with a torque proportional to the linear acceleration of the vehicle along axis $xx'$. In this way, the linear-angular analog is established, and the total angular displacement of flywheel 18, as reflected by the axial displacement of nut 28, is made to be proportional to the distance travelled by the vehicle along axis $xx'$. It is presumed that the acceleration of gravity has been compensated for.

Consequently, at a predetermined distance along its trajectory from the starting point, arming ring 31 will complete the arming circuit between terminals 32.

It is to be noted that the use of differential gears 23 permits the independent choice of the moment of inertias of rotors 17 and 18. This allows flywheel 18 to be massive so as to increase the scale factor, while permitting the pendulous servo rotor 17 to have minimum inertia for a fast response time.

Many substitutions and changes within the scope of my invention will be evident to those skilled in the art. For instance, pneumatic or explosive energy storage means may be used in place of spring 1; or, alternatively to the use of kinetically stored energy, rotor 2 may be driven by an electric motor. Further, gearing between 2 and 11 may be used to increase the gain of the servo loop.

For these reasons, it is evident that the preferred embodiment here specified is intended to be illustrative only, and in no way to limit the scope of the claims.

What I claim is:

1. In an integrating accelerometer, the combination comprising: an integrating flywheel; a mass pendulous about an axis; a torque source rotor; means to rotate said torque source rotor; a torquing rotor member; differential gear means to distribute the torques applied to said torquing member between said integrating flywheel and said pendulous mass; modulateable torque coupling means for applying torque from said torque source rotor to said torquing member; means responsive to the angular displacement from a predetermined position of said pendulous mass about its axis to modulate said coupling means in a direction tending to restore said pendulous mass to said predetermined position; an arming device; and means responsive to a predetermined angular displacement of said integrating flywheel to actuate said arming device.

2. In a device in accordance with claim 1, said torque source rotor being a fuse-restrained energy-storage flywheel, and said means to rotate said torque source being a spring.

3. In a device in accordance with claim 1, said modulatable means including a friction clutch.

4. In a device in accordance with claim 1, said means responsive to the angular displacement of said pendulous mass being lever means.

5. In an integrating accelerometer the combination comprising: a pendulous rotor; an integrating flywheel rotor; differential gear means angularly coupling said pendulous rotor and said integrating rotor; a torque generator; servo means responsive to the angular displacement of said pendulous rotor for coupling said torque generator to said differential gearing means whereby simultaneously to apply torque to both said pendulous rotor and said integrating rotor, the said torque applied to said pendulous rotor being in a direction tending to reduce the angular displacement of said pendulous rotor from a predetermined position; an arming device; and means responsive to a predetermined angular displacement of said integrator rotor to actuate said arming device.

6. In a device in accordance with claim 5, said torque generator comprising: a source of potential energy; an energy storage flywheel; and means responsive to a starting signal to convert a substantial portion of said potential energy source into rotational energy of said energy storage flywheel whereby to supply torque to said differential gearing under control of said servo means.

7. In an integrating accelerometer, the combination comprising: an integrating flywheel; a mass pendulous about an axis; a torque source rotor; a torquing rotor member; differential gear means to distribute the torques applied to said torquing member between said integrating flywheel and said pendulous mass; modulatable torque coupling means for applying torque from said torque source rotor to said torquing member; means responsive to the angular displacement of said pendulous mass about its axis to modulate said coupling means in a direction tending to angulate said pendulous means toward a predetermined angular position; said torque source rotor being a fuse restrained energy storage flywheel, and said means to rotate said torque source being a spring.

References Cited in the file of this patent

UNITED STATES PATENTS

| | | |
|---|---|---|
| 2,933,299 | Bouvier | Apr. 19, 1960 |
| 2,942,475 | Johnson | June 28, 1960 |
| 2,967,217 | Alpert | Jan. 3, 1961 |

FOREIGN PATENTS

| | | |
|---|---|---|
| 530,697 | France | Oct. 10, 1921 |